United States Patent [19]

Antheunis et al.

[11] Patent Number: 5,449,560
[45] Date of Patent: Sep. 12, 1995

[54] COMPOSITION SUITABLE FOR GLASS LAMINATE INTERLAYER AND LAMINATE MADE THEREFROM

[75] Inventors: Nicole Antheunis, Keerbergen, Belgium; Andreas T. F. Wolf, Midland, Mich.

[73] Assignee: Dow Corning S.A., Seneffe, Belgium

[21] Appl. No.: 173,405

[22] Filed: Dec. 23, 1993

Related U.S. Application Data

[63] Continuation-in-part of Ser. No. 899,801, Jun. 17, 1992, abandoned.

[30] Foreign Application Priority Data

Jul. 5, 1991 [GB] United Kingdom ............... 914526

[51] Int. Cl.⁶ ............................................. B32B 27/00
[52] U.S. Cl. ............................... 428/447; 428/448; 523/212; 524/862; 528/15; 528/31; 528/32
[58] Field of Search ................... 523/212; 524/862; 528/15, 31, 32; 525/478; 428/447, 448

[56] References Cited

U.S. PATENT DOCUMENTS

| | | | |
|---|---|---|---|
| 2,676,182 | 4/1954 | Daudt et al. | 260/448.2 |
| 3,616,839 | 11/1971 | Burrin et al. | 161/193 |
| 4,344,800 | 8/1982 | Lutz | 106/308 Q |
| 4,418,165 | 11/1983 | Pulmenteer | 523/212 |
| 4,477,626 | 10/1984 | Suzuki | 524/862 |
| 4,681,810 | 7/1987 | Gomez | 428/429 |
| 4,704,304 | 11/1987 | Amendola et al. | 427/57 |
| 4,704,418 | 11/1987 | Gomez | 524/141 |
| 4,742,142 | 5/1988 | Shimizu et al. | 528/15 |
| 4,743,670 | 5/1988 | Yoshida et al. | 528/15 |
| 4,749,765 | 6/1988 | Shimizu et al. | 528/15 |
| 4,753,978 | 6/1988 | Jensen | 524/862 |
| 4,785,047 | 11/1988 | Jensen | 524/714 |
| 4,857,564 | 8/1989 | Maxson | 523/212 |
| 4,882,398 | 11/1989 | Mbah | 525/478 |
| 4,978,696 | 12/1990 | Clark et al. | 523/212 |
| 4,985,525 | 1/1991 | Clark et al. | 528/15 |
| 5,059,484 | 10/1991 | Clark et al. | 428/412 |

FOREIGN PATENT DOCUMENTS

| | | |
|---|---|---|
| 2213162 | 8/1974 | France . |
| 2394394 | 1/1979 | France . |
| 783867 | 10/1957 | United Kingdom . |
| 2080378 | 2/1982 | United Kingdom . |

*Primary Examiner*—Ralph H. Dean
*Attorney, Agent, or Firm*—Roger H. Borrousch

[57] ABSTRACT

A liquid curable composition prepared from a polydiorganosiloxane having ethylenically unsaturation, a polyhydrogenorganosiloxane, a catalyst for the addition of silicon-bonded hydrogen to ethylenically unsaturation, a particulate filler wherein the composition cured to an elastomeric state has a loss modulus, $E''$, of at least 100 MPa at $-120°$ C., a loss tangent of at least 0.15 at $-120°$ C., and a tear strength of less than 10 kN/m at 23° C., makes an interlayer for a laminate of glass or other brittle which fails safely when receiving a breaking impact.

15 Claims, No Drawings

COMPOSITION SUITABLE FOR GLASS LAMINATE INTERLAYER AND LAMINATE MADE THEREFROM

This is a continuation-in-part of application Ser. No. 07/899,801 filed on Jun. 17, 1992, now abandoned.

BACKGROUND OF THE INVENTION

1. Field of the Invention

This invention relates to novel siloxane compositions and to the use of such compositions in the fabrication of fire- and impact-resistant safety glass laminates. More particularly, the invention is concerned with the provision of optically clear silicone interlayers that can be applied between two or multiple sheets of glass or other brittle materials by casting-in-place and curing them at room temperature or elevated temperatures. Furthermore, the invention relates to glass laminates made with the cast-in-place silicone interlayers and their use as barriers to fire or impacting bodies.

2. Background Information

Laminated structures such as windows and windshields comprising sheets of glass and/or plastic having therebetween an interlayer of organic or organosilicon material are known. For example G.B. Patent Specification 783 867 discloses organopolysiloxane compositions which are convertible to transparent elastomers and which are useful as interlayers in the preparation of safety glass. French Patent No. 2 213 162 discloses sound insulating windows comprising two spaced sheets of glass in which the space is filled with a silicone elastomer.

Impact resistant, optically clear, laminated safety glass comprising sheets of glass and/or plastic having therebetween an interlayer of organic or organosilicon material are known for use principally as windshields in vehicles or aircraft and as windows in commercial and private buildings. The safety glass is manufactured by either autoclaving the glass and/or plastic panes with performed (calendered) sheets of elastomeric or thermoplastic interlayer or by pouring corbel compositions in the space between the glass panes and curing them in place (cast-in-place). Polyacetals, especially polyvinylbutyral, and to some extent silicones, based on high molecular weight gums and highly reinforcing silicas, are used for the autoclaving process. Polyacrylates, such as polymethacrylate, are typically used in the cast-in-place process, which is of particular interest because of the low processing equipment costs associated with it.

The performance of such glass laminates in fire and impact resistance tests not only depends on the material used as interlayer, but also on the type of glass. Regular silicate glass (float glass), wired silicate glass, heat strengthened (annealed or tempered) silicate glass, heat strengthened borosilicate glass, glass ceramic, or visually clear thermoplastics (polyacrylate, polycarbonate) can be used for manufacture of the glass laminate. Regular silicate glass is of particular interest because of its low material cost and is the preferred material of choice for manufacture of laminated glass targeted at the lower safety requirement classes in the building industry.

When safety glass manufactured from regular silicate glass sheets is exposed to fire, the glass directly exposed to the fire cracks almost immediately, exposing the interlayer to further attack from the fire. When such safety glass has been manufactured with thermoplastic organic interlayer, the heat radiated from the fire will cause the interlayer to melt and flow through the cracks in the glass. The molten thermoplastic interlayer will then drip to the base of the assembly, where it is consumed by the fire, typically within a few minutes. Continued fire exposure results in pieces of glass falling away and eventual disintegration of the laminated glass structure. As further glass panes crack, the process repeats itself, until the complete glass structure collapses, and fire and smoke are free to penetrate the opening. Safety glasses manufactured by laminating two sheets of regular silicate glass with a thermoplastic organic interlayer, whether performed or cast-in-place, do not pass a 30 minute fire endurance test; the minimum required to achieve a fire resistance rating.

Attempts to overcome the poor fire performance of glass laminates made with organic thermoplastic interlayers have involved the use of wired glass, where a wire mesh is employed to provide strength to the glass. However, the visually apparent wire mesh tends to detract from the aesthetics of the window. Other attempts focused on improving the heat stability and/or the fire resistance of the thermoplastic interlayer. For example Gomez in U.S. Pat. No. 4,681,810, issued Jul. 21, 1987, and in U.S. Pat. No. 4,704,418, issued Nov. 3, 1987; and Amendola et al in U.S. Pat. No. 4,704,304, issued Nov. 3, 1987, disclose the addition of a plasticizer blend of a char-forming component, such as an organic phosphate, and an oxygen sequestering agent, such as an organic phosphite, to a polyvinyl butyral (PVB) composition. These attempts, however, typically decrease the UV resistance of the interlayer, causing it to discolorate over time.

Laminated glass structures having fire resistant properties have been developed wherein the interlayer is formed from an organic resin. Also, there is disclosed ill French Patent No. 2 394 394 a fire resistant window comprising at least two sheets of glass having therebetween a sheet of silicone elastomer, characterized ill that the sheet of glass facing tile fire is not fire resistant and the other sheet of glass is fire resistant.

In general, thermoplastic organic interlayers suffer from poor weather-resistance, especially poor hydrolytical stability, which requires special glazing measures.

Other safety glasses are manufactured by casting sols of mainly inorganic nature between silicate glass panes. As the sol gels, it provides additional stability to the laminate structure. Since these interlayer gels contain water, they foam in place when exposed to the radiated heat of a fire. As the water evaporates from such interlayers, they discolor and, thus, shield the outer glass pane from heat radiation. These special interlayer gels are very costly and in normal, non-fire use have more color (yellowness) and further reduced weatherability (resistance to UV) than do conventional organic thermoplastic interlayers.

Impact resistance of laminates made from brittle materials is generally achieved through the use of though interlayers. As the body impacts on the laminated structure, its kinetic energy is transformed into shock waves that travel through the glass plates and the interlayer. For low impact energies, the glass laminate deflects only elastically, the impacting body does not cause crack formation in the impacted glass plate. The same phenomenon occurs in the initial state of a high energy impact: The glass laminate deflects elastically up to a certain maximum energy stored, then a crack is formed in the impacted glass plate, which propagates in the further deflecting plate. As the glass laminate continues to deflect, cracks are formed in the second glass plate, and potentially in further glass plates even farther remote to the impact. Since glass is a brittle material, the load rapidly approaches zero within a very small total displacement, once a crack has initiated in a glass plate. The fracturing of the glass plate, therefore, contributes only a limited amount to the dissipation of the impact energy. In case of tough interlayers, such as the well known polyvinylacetals or high strength silicones, large displacements of the interlayer occur during the impact process, contributing strongly to the total absorbed energy. The impacting body is then retained by the tough interlayer, even when a complete fracture of all glass plates has occurred.

Organopolysiloxane compositions used in the manufacture of laminated structures are known. These materials are either performed sheets made by calendering gum-type elastomers or liquid compositions. For example, Clark and Smith in U.S. Pat. No. 4,985,525, issued Jan. 15, 1991, and in U.S. Pat. No. 5,059,484, issued Oct. 22, 1991, disclose compositions having cohesive bonding to a variety of organic polymer substrates and comprising a polydiorganosiloxane gum having silicon-bonded unsaturated groups, an organohydrogenpolysiloxane, a platinum catalyst, a second polydiorganosiloxane gum containing a specified concentration of silanol groups, and a treated silica reinforcement filler. One type of treated silica disclosed by Clark and Smith is the one described by Lutz in U.S. Pat. No. 4,344,800, issued Aug. 17, 1982. Such materials are of high viscosity and cannot be applied by casting-in-place. They are also characterized by high tensile and tear strength.

Liquid polysiloxane compositions that can be cast-in-place and cure at room or slightly elevated temperature are, for instance, those disclosed by Burrin et al in U.S. Pat. No. 3,616,839, issued Jun. 30, 1967, who disclose a silicone resin cast-in-place interlayer for laminating glass with a stretched acrylic plastic sheet. One type of such silicone resin disclosed by Burrin et al uses as a cure mechanism the addition of an SiH linkage of one organopolysiloxane molecule across the double bond of an olefinically-unsaturated radical attached to another organopolysiloxane molecule. The stated advantage of such a structure is that it permits the combination of an external abrasion resistant glass surface with a plastic sheet which can function as a load bearing member. Similar compositions are disclosed in other references. For example, G.B. 2 080 378A discloses the use of inter alia such platinum-catalyzed compositions as a thermal barrier in the channels of windows. The compositions may contain a filler which is non-reinforcing for silicone rubbers. Suzuki in U.S. Pat. No. 4,477,626, issued Oct. 16, 1984, discloses platinum-catalyzed gel-forming compositions obtained by mixing a polydiorganosiloxane having at least two vinyl groups per molecule, a polydiorganosiloxane having at least two silicon-bonded hydrogen atoms per molecule, a platinum catalyst, fine silica powder and a polyorganosiloxane having at least 0.5% of hydroxyl groups The presence of the latter component is stated to produce the desired thixotropy in the compositions. Clark et al in U.S. Pat. No. 4,978,696, issued Dec. 18, 1990, disclose liquid organosiloxane compositions that cure by a hydrosilylation reaction and contain from 0.1 to about 2 weight percent of a low molecular weight polymethylvinylsiloxane. The inventive feature of Clark et al ('696) resides in the use of the low molecular weight polymethylvinylsiloxane, which lowers the modulus and increases the elongation of the cured composition sufficiently to achieve a high level of flexibility. The stated advantage of such composition is that it allows for the absorption of stresses resulting from the unequal rates of expansion or contraction of two dissimilar substrates that are bonded using the composition. Clark et al ('696) specifically require the use of an optically clear reinforcing filler. Organosiloxane copolymers, such as the ones disclosed by Daudt and Tyler in U.S. Pat. No. 2,676,182, issued Apr. 20, 1954, are specified as one class of reinforcing fillers. A second class of optically transparent reinforcing fillers includes finely divided silica of the type described by Lutz ('800).

Several properties are required in an interlayer for use in the fabrication of fire resistant laminated glass structures. They must, for most applications, be substantially transparent when cured, exhibit low shrinkage and be able to pass the prescribed fire endurance test. In case of laminated safety glass structures made from materials that themselves do not provide sufficient impact resistance to pass the test requirement, such as regular float glass (not tempered, heat strengthened, or wire reinforced), the interlayer has to be strong and tough (high tensile and tear resistance) to prevent the impacting body from penetrating the laminate structure. The interlayer should have good (ideally unprimed) adhesion to glass and its adhesion as well as physical properties should not degrade under environmental influences. A further, preferred, property is that the interlayer composition should be flowable and thus capable of convenient introduction into the space between the glass sheets. The flowable cast-in-place interlayer should rapidly cure, preferably at room temperature, to allow handling of the laminated glass structure within a few hours of casting the interlayer.

Prior art interlayer compositions have not been able to fulfill these requirements. For example, organic resin interlayers melt at high temperatures thus allowing the laminate to shear. They also have poor adhesion to glass at high temperature, thereby allowing the broken pieces of glass to fall away and permit access of the fire to the outer pane. In addition, the organic layer can be flammable. Silicone based interlayers generally have better fire resistance and less tendency to high temperature softening than the organic resins. However, those silicone interlayers that are sufficiently tough to resist the penetration of an impacting body are generally available as pre-formed sheets and, if formulated as a liquid composition, do not lend themselves to application by cast-in-place techniques, due to their high viscosity. Silicone interlayer formulations, on the other hand, that are of sufficiently low viscosity to be applied by cast-in-place techniques, lack the strength to resist the penetration of an impacting body.

SUMMARY OF THE INVENTION

An object of this invention is to provide a low viscosity room-temperature-curable silicone composition which can be applied by cast-in-place techniques, which has minimal volume shrinkage upon cure, and which, when cast-in-place and cured has flawless optical clarity. Another object of this invention is to provide laminated glass structures, made from sheets of regular float glass and the above described composition, to pass at least the minimum fire and impact resistance tests applicable in the building industry.

Surprisingly, we have now found that impact and fire resistant laminated glass structures can be manufactured using comparatively soft and weak silicone materials as interlayer, provided the silicone material exhibits certain minimum values for loss modulus E" and loss factor tan delta at −120° C. Contrary to conventional laminated safety glass, in which the glass panes shatter and the high strength interlayer absorbs most of the impact energy by plastic or elastic deformation, laminated glass made according to the current invention relies on the fact that most of the impact energy is dissipated in the interlayer so that one of the glass panes will be able to carry the remaining impact energy without fracture by elastic deformation or "fail safely" (as defined in British Standard BS 6206).

This invention relates to a liquid curable composition comprising (A) at least one -polydiorganosiloxane wherein the silicon-bonded organic substituents are monovalent hydrocarbon groups having from 1 to 14 carbon atoms, at least 70 percent of said organic substituents being methyl and there being present at least two silicon-bonded ethylenically-unsaturated groups per molecule on average, (B) at least one organohydrogensiloxane having at least two silicon-bonded hydrogen atoms per molecule on average, (C) a catalyst for the addition of SiH groups to silicon-bonded ethylenically unsaturated groups, and (D) a particulate filler which is at least partially insoluble in the composition, said composition having in the cured elastomeric state a loss modulus E" of at least 100 MPa at a temperature of −120° C., a loss factor (tan delta) of at least 0.15 at a temperature of −120° C., E" and tan delta being measured at 16 Hertz and 0.1% strain, and a tear strength of less than 10 kN/m at 23° C.

This invention also relates to a laminated structure comprising at least two panels of glass or other rigid brittlesheet material, having sandwiched between at least two of said panels, cured product of the liquid curable composition defined above, and said laminate when receiving a panel breaking impact fails safely.

DETAILED DESCRIPTION OF THE PREFERRED EMBODIMENTS

In the polydiorganosiloxane (A), at least 70 percent of the silicon-bonded substituents are methyl groups and at least two silicon-bonded substituents per molecule on average are ethylenically-unsaturated groups having from 2 to 14 carbon atoms, for example vinyl, allyl, hexenyl, or dodecenyl. Any remaining silicon-bonded substituents in the polydiorganosiloxane are monovalent hydrocarbon groups having from 2 to 14 carbon atoms and which are free of ethylenic unsaturation for example ethyl, propyl, hexyl, tetradecyl, phenyl, phenylethyl, and styryl. The preferred polydiorganosiloxanes are those wherein the ethylenically-unsaturated substituents are selected from vinyl and hexenyl and substantially all of the remaining substituents are methyl. Examples of the preferred polydiorganosiloxanes (A) therefore include copolymers of dimethylsiloxane units and methylvinylsiloxane units, copolymers of dimethylsiloxane units and dimethylvinylsiloxy units, copolymers of dimethylsiloxane, methylvinylsiloxane, and phenylmethylvinylsiloxy units, copolymers of dimethylsiloxane and methylhexenylsiloxane units, and copolymers of dimethyl-siloxane and dimethylhexenylsiloxy units. Preferably, the average number of ethylenically-unsaturated groups present per molecule lies within the range from 2 to 6.

In general, the molecular size of the polydiorganosiloxanes is not critical and they may vary from freely flowing liquids to gummy solids. However, the preferred method of employing the compositions is as cast- and cured-in-place interlayers. The preferred polydiorganosiloxanes (A) are therefore those having a viscosity in the range from about 100 to about 10,000 cS ($10^{-4}$ to $10^{-2}$ m$^2$/s) at 25° C., thus facilitating the formulation of a composition having the desired pourable consistency. If desired, mixtures of polydiorgano-siloxanes of differing molecular size may be employed to achieve the desired viscosity characteristics or, in combination with filler (D), the desired values of E" and tan delta.

As component (B) of the compositions of this invention there are employed organohydrogensiloxanes having at least two silicon-bonded hydrogen atoms per molecule on average. The organic substituents present on the remaining silicon atoms may be any monovalent hydrocarbon group having from 1 to 6 carbon atoms and which is free of aliphatic unsaturation, for example methyl, ethyl, or phenyl. The organohydrogensiloxanes (B) may be homopolymers or copolymers or combinations of two or more of these having different molecular size and/or silicon-bonded hydrogen content. Thus, they may comprise units of the formula

$$R_aHSiO_{(3-a/2)}$$

wherein R is for example methyl, ethyl, or phenyl and a is 1 or 2 either alone or combined with copolymeric siloxane units, for example dimethylsiloxane units or methylphenylsiloxane units. Having regard to the desired pourability of the curable composition, they are preferably of relatively low viscosity, but they may have viscosities as high as 20,000 cS ($2 \times 10^{-2}$ m$^2$/s) at 25° C. Preferred as organohydrogensiloxanes (B) are the methylhydrogensiloxanes, for example (CH$_3$HSiO)$_n$, (n is an integer), copolymers of methylhydrogensiloxane CH$_3$HSiO units and trimethylsiloxy units, copolymers of dimethylsiloxane, methylhydrogensiloxane, and trimethylsiloxy units, copolymers of dimethylsiloxane and dimethylhydrogensiloxy units, and combinations of two or more of such siloxane homopolymers and copolymers. Mixtures of organohydrogensiloxanes having different molecular weights and/or different proportions of SiH content may be employed.

Catalysts which are effective in promoting the addition of ≡SiH groups to silicon-bonded ethylenically-unsaturated groups can be employed as component (C) of the compositions of this invention. A variety of such catalysts are known and described in the art, including metallic platinum, platinum deposited on or chemically bound to supports such as carbon, silica, and alumina, ruthenium, rhodium, and palladium, salts of the platinum metals, including platinic chloride and chloroplatinic acid, and complexes obtained by reacting platinum compounds with unsaturated organic and organosilicon compounds such as cyclohexene and vinyl-containing siloxane oligomers. The preferred catalysts, in view of their activity, availa-bility, or compatibility with the other ingredients of the composition are the platinum compounds and complexes thereof with polyorganosiloxanes having silicon-bonded olefinically unsaturated organic substituents, such as vinyl groups. The catalyst (C) may be employed in proportions sufficient to provide the desired rate of cure. In general, proportions conventional in the art and providing from about 5 to about 30 parts by weight of platinum metal per million parts of the combined weight of components (A) and (B) will provide the desired result.

The filler (D) is a filler which is at least partially insoluble in the liquid curable composition, which has fire resistant properties and which provides in the cured composition the stated minimum values of E" and tan delta specified herein. Suitable fillers (D) include fumed and precipitated silicas which have been treated with siloxanes. Particularly suitable fillers are particulate, flowable materials consisting essentially of reinforcing silicas, having absorbed thereon a high proportion of a polydiorganosiloxane wherein at least 80 percent of the total organic substituents are methyl, any remaining organic substituents being selected from phenyl and vinyl groups. The absorbed polydiorganosiloxane should comprise at least 30%, and more preferably at least 50%, by weight of the weight of the filler. Such particulate filler materials may have up to 65 percent or more of the absorbed polydiorganosiloxane, provided that they remain in the essentially non-liquid state. The preferred reinforcing silicas are those having a high surface area to weight ratio, for example surface areas of from about 50 to about 500 square meters per gram. The molecular size of the absorbed polydiorganosiloxane is not critical, but polydiorganosiloxanes having viscosities within the range of 1,000 to 20,000 cS (0.001m$^2$/s to 0.02 m$^2$/s) at 25° C. are preferred having regard to availability and to ease of treatment of the silica substrate. Also particularly suitable and preferred as filler (D) are silicone elastomers in finely-divided particulate form. Such particulate elastomers may be prepared by spraying or emulsion techniques, for example as described by Shimizu in U.S. Pat. No. 4,742,142, Re-examination Certificate issued Sep. 3, 1991; by Yoshida et al in U.S. Pat. No. 4,743,670, issued May 10, 1988; and by Shimizu et al in U.S. Pat. No. 4,749,765, issued Jun.7, 1988. Fillers of particular utility in the compositions of this invention are available commercially from Dow Corning Toray Silicone Limited, Tokyo, Japan, under the trade name Trefil. The particle size of the filler Component (D) is not critical in terms of the impact and fire resistance performance of laminate structures made with the interlayer provided the filler allows achievement of the needed values of loss modulus, E", and loss factor, tan delta, and is in a flowable form which enables it to be incorporated homogeneously into the curable composition. However, in order to achieve interlayers of high translucency, the average particle size of the silica used in making the silica-polydiorgano-siloxane agglomerate filler has to be smaller than the wavelength of visible light. The particle size of the silicone elastomer particulate filler is not critical in terms of the translucency of the cured interlayer, provided the silicone elastomer particulate is fully compatible with the polydiorgano-siloxane matrix of the cured interlayer. In general, the preferred fillers are those having a particle size within the range of from 1 to 500 micrometers in the case of the polydiorganosiloxane fluid-silica agglomerate fillers and from 0.1 to 50 micrometers in the case of the silicone elastomer particulate fillers. As little as 0.05 per cent by weight of the filler (D) may be employed, but it is preferred that it should comprise at least one percent and more preferably from 2 to 15 percent of the total weight of the components (A) to (D). However, the proportion employed will be determined to some extent by the desired viscosity and pourability of the curable composition and degree of transparency required for the interlayer. Where the composition is employed to form a cast- and cured-in-situ interlayer it is preferred that its viscosity is less than 5,000 cS (0.005 m$^2$/s) at 25° C.

The particularly suitable fillers (D) referred to above are especially advantageous inasmuch as they result in cured compositions which are substantially transparent as well as providing the desired impact and fire resistance in glass laminates.

In addition to the essential Components (A) to (D), the compositions of this invention may contain certain optional ingredients, for example "secondary" fillers which do not affect the minimum values of loss modulus E" and loss factor tan delta, additives for reducing the viscosity of the composition, additives which confer flame retardant properties in the cured interlayer, for example compounds of transition metals such as titanium butoxide, zirconium silicate, and zirconium octoate, adhesion promoting substances, and additives for inhibiting cure of the composition. Preferred "secondary" fillers for use in the compositions of this invention are resinous copolymers of $R_3SiO_{0.5}$ units and $SiO_2$ units, wherein R is selected from methyl groups and vinyl groups. Preferably, at least 70 per cent of R groups are methyl and at least one R group per molecule is vinyl.

The compositions of this invention can be employed to form interlayers for a variety of laminated structures using two or more panels of the same or different materials such as glass, glass to plastic (e.g. acrylic), or plastic to plastic. They are, however, particularly adapted for application as interlayer materials for use in fire and impact resistant safety glass structures comprising two or more sheets of glass. The compositions may be performed and cured into interlayer sheets and thereafter laminated with the glass panes. A more preferred method of forming the laminated structures, however, comprises introducing the liquid curable compositions into the space defined between the glass panes and thereafter allowing the composition to cure at normal ambient or slightly elevated temperatures (up to 50° C). If desired, the bonding of the curable composition to the glass or other members of the laminated structure may be enhanced by pretreating of the surface of the member with a primer or other adhesion promoting substance.

The compositions of this invention provide several advantageous benefits when used as interlayers such as between glass sheets. These compositions cure to a rubbery material which is resistant to ultraviolet radiation, do not exhibit yellowing over extended periods of time, do not exhibit cracking when exposed to low temperatures, are stable when exposed to humid conditions, and sheets of the cured material have good cuttability. Also these compositions exhibit advantageous processing characteristics such as they exhibit essentially no shrinkage upon curing and they exhibit essentially no reactivity with other materials used in the construction of windows such as sealants which release acetic acid upon curing.

Compositions of this invention have in the cured elastomeric state a loss modulus E" of at least 100 MPa at a temperature of −120 ° C., preferably from 200 to 500 MPa; a loss factor (tan delta) of at least 0.15 at a temperature of −120° C., preferably from 0.2 to 0.3; and a tear strength of less than 10 kN/m at 23° C. E"

and tan delta are measured at 16 Hertz and 0.1% strain. The preferred compositions used as an interlayer to make impact resistant glass laminates have a tear strength of less than 1 kN/m.

The invention also includes laminated structures comprising at least two panels of glass or other brittle, rigid sheet material, having in the space therebetween an interlayer comprising the cured product of a composition of this invention.

The loss modulus, $E''$, and the loss factor, tan delta, are measures for a material's ability to dissipate energy and to achieve efficient damping. The loss factor is defined as the ratio of the loss modulus $E''$ to the storage modulus $E'$. The storage modulus $E'$ represents a material's ability to store energy elastically.

Laminated glass structures made with soft, weak (low tensile and tear strength) interlayers can successfully pass a medium energy impact, if sufficient mechanical energy is dissipated by the interlayer, such that the remaining mechanical energy does not suffice to initiate a crack in the second or further glass plates, or causes the glass plate to fail "safely". Molecular relaxations within the polymeric network of the interlayer are responsible for the conversion of mechanical energy stored in these shock waves into heat through friction. This dissipation of mechanical energy is only effective, if the molecular relaxations occur within the short time scale of the impact deformation. Since sufficiently fast molecular relaxation translates into high energy dissipation, it would be desirable to measure the relaxation times of the polymeric interlayer at the temperature at which the impact test is carried out, which generally is room temperature. However, molecular relaxation times this short are difficult to measure directly. Fortunately, they increase with decreasing temperature, making it possible to measure relaxation times indirectly at low temperatures using the time-temperature superposition principle.

Relaxation times measured in a dynamic mechanical test at low temperatures and at low strain frequencies can be mathematically related to those at high temperature and high strain frequencies, for instance by using the time-temperature superposition introduced by Williams, Landal, and Ferry (WLF method) as set out in the book "Viscoelastic Properties of Polymers," pages 264–320, by J. D. Ferry (Third Edition, John Wiley & Sons, 1980).

The method of time-temperature superposition is based on the observation that increasing temperature is equivalent to decreasing the measuring frequency in their effects on $E'$, $E''$, and tan delta. This is because both changes increase the amount of molecular relaxation occurring in a system. The WLF method allows for the conversion of low frequency, low temperature data to equivalent high temperature, high frequency data. The method was derived empirically from viscosity data over a wide temperature range, but is supported by several polymer theories.

In order to effectively dissipate mechanical energy during the impact process, the interlayer has to provide fast molecular relaxation mechanisms at room temperature. Since molecular relaxation times increase rapidly as the temperature is lowered close to the glass transition temperature of the polymer, the viscoelastic properties need to be determined near the glass transition temperature of the polysiloxane network studied. Interlayers that are designed to dissipate mechanical energy rapidly at room temperature by molecular relaxation thus can be evaluated by comparing their loss modulus, $E''$, and loss factor, tan delta, at longer more convenient times at low temperatures. The higher both values are, the greater the molecular relaxation process mechanisms are at the measured time and temperature. We have now found that the minimum values of $E''$ and tan delta values specified above are required to effectively pass the British Standard BS 6206, class C, impact resistance test with the simplest laminate structure made from two sheets of 3 mm thick float glass sandwiching a 2 mm thick, soft and weak (low tensile and tear strength) silicone interlayer obtained from the compositions described herein.

Elastic Storage Modulus and Loss Modulus

In practice, the elastic storage modulus $E'$, the loss modulus $E''$, and the loss factor (tangent delta) of cured (solid) polymeric materials can be measured on automated dynamic mechanical analyzers, such as the Rheometrics Solid Analyzer RSA II. The Rheometrics RSA II allows measurement of the viscoelastic properties of solid materials over ranges of temperatures ($-150°$ C. to $500°$ C.) and oscillatory strain frequencies (0.01 to 100 rad/sec or 100 to 0.01 sec time scales, respectively). The test procedure used to examine the interlayer formulations was as follows: The test samples were cooled from ambient temperature down to $-150°$ C. by a stream of cold nitrogen while exposing them to an oscillatory elongation strain. It was important to keep the elongational strain amplitude low, especially when measuring at lower temperature or higher oscillatory frequencies, to ensure that the material was in its linear stress-strain region, i.e. that the loss modulus was not a function of strain. The strain amplitude was, therefore, decreased linearly from 0.5% to 0.1% with the temperature decrease. The oscillatory frequency was swept from 1 rad/s to 100 rad/s at a given temperature. The sample temperature was then adjusted by $4°$ C.; a soak time of 5 minutes was allowed to this temperature change.

The following experimental conditions were chosen in determining the viscoelastic properties of the cured silicone interlayers. The materials were cured for 4 weeks at ambient temperature ($23°$ C.) prior to the measurement.

| Test System: | Rheometrics RSA II in elongation |
|---|---|
| Temperature Range: | $+20°$ C. to $-150°$ C. |
| Frequency Range: | 1 to 100 rad/sec |
| Temperature Soak: | 5 minutes |
| Strain Amplitude: | 0.5% to 0.1% |

Impact Resistance

Improvements in the impact resistance of glass laminates made with silicone interlayers were first studied in a screening test. For this purpose, two square panes of regular float glass with 300 mm edge length and 3 mm glass thickness were laminated together with the silicone composition by holding the glass panes with suitable spacers 2 mm apart and casting the silicone composition into place. The test units were stored at ambient temperature ($23°$ C.) for four weeks. The glass laminates were then placed on a timber box in such a way, that the glass "bite" on the timber frame (the overlap between the laminated glass pane and the timber frame) was 10 mm. The screening test consisted of allowing a metal cannon ball with a mass of 2000 g to accelerated in free fall from 1000 or 2000 mm heights before impacting on the center of the test units. It had been previously determined that a good correlation exists between the screening test on above described small test units and British Standard BS 6206 ("Specification for Impact Performance Requirements for Flat Safety Glass and Safety Plastics for Use in Buildings") carried out on full-sized test units (865 mm edge length, 3 mm glass thickness, 2 mm interlayer thickness). Dropping the cannon ball from 1000 mm or 2000 mm heights was found to generate the same results as the BS 6206 test for Class C (135 Joule impact) or Class B (202 Joule impact), respectively. Interlayers that passed the screening test were also evaluated in the full-size BS 6206 mock-up. In order to pass the impact resistance tests, at least one of the glass panes had to withstand the impact without breaking, or both glass panes had to fail "safely", as defined in BS 6206.

The glass surfaces exposed to the interlayer of the laminates for testing impact resistance and fire resistance were primed with a commercial primer, DC 1200, available from Dow Corning Corporation,, Midland, Michigan. Care was used to ensure that the entire glass surface was primed.

The laminate test units were prepared by a casting process. For small sized laboratory units of about 300×300 mm, a polyisobutylene tape fabricated with a co-extruded rubber core (seal), was applied along three sides of the perimeter of one glass pane. Each extremity of the tape was covered on a length of 100 mm by a plastic film to avoid adhesion of the tape to the glass, and thus, allowed for a larger thickness of the interlayer during the casting process. Then a second glass pane was carefully attached to the first pane by pressing it against the polyisobutylene seal. The glass unit was then set at a 60 degree angle and a liquid composition for preparing the interlayer was cast into the space between the two glass panes by pouring the liquid composition through a funnel attached to the fourth (open) side of the unit. The liquid composition flowed into the glass unit following the gravitational force. The filling process was completed within about one-half of the the "pot-life" of the composition used for preparing the specified laminate. After the filling process was completed, the plastic film was carefully removed from the polyisobutylene seal, and the laminated glass was evenly compressed to a defined thickness. Excess composition exuded from the open fourth side and was scraped off. The unit was then stored in the horizontal position to allow the glass panes to straighten out into a perfect parallel position. After several hours of cure at room temperature, the unit was placed into a vertical position and stored for completion of the cure.

The liquid compositions as described above and used in the following examples were prepared by mixing a base composition, a crosslinker composition, and in some cases a paste composition.

The same procedure was used for larger size units, except that at the end of the filling process, the unit was progressively moved to the horizonal position, to allow the liquid interlayer to equilibrate in thickness. The fourth (open) side of the laminated glass unit was then sealed as the liquid interlayer reached the extremity of the glass pane.

Fire Resistance

Fire resistance of the laminated glass structure was evaluated in indicative fire tests according to BS 476, Part 22 ("Fire Tests on Building Materials and Structures, Part 22: Methods for Determination of the Fire Resistance of Non-Loadbearing Elements of Construction") and DIN 4102, Part 5 ("Behavior of Building Materials and Components in Fire; Fire Resistant Glazings"). Laminated glass structures were constructed as described before and glazed either into timber or steel frames using conventional fire resistant glazing techniques. After storing the laminated structures for four weeks at ambient temperature (23° C.), the units were fixed into the opening of an indicative fire test rig in accordance with either BS 476, part 22, or DIN 4102, part 5, and exposed to the heating cycle (time-temperature curve) as set out in these standards. Integrity failure time was recorded as defined in these standards, which typically was reached by flaming occurring at the outer pane (the one being remote from the fire). Various laminate configurations (two or three glass panes with one or two interlayers) and various laminate dimensions were studied.

Mixing Procedure for Base Composition, Crosslinker Composition, Paste Composition, and Liquid Composition A base composition, a crosslinker composition, a paste composition, and a liquid composition made form a base composition, a crosslinker composition, and if used a paste composition were homogeneously mixed in weight ratios as specified in the following examples. Compositions containing filler G (defined further herein) were easily mixed using low shear mixing equipment, such as a planetary mixer. Achieving good, homogeneous mixtures which contained filler H or I, required higher shear mixing equipment, such as a GREAVES mixer (JayCo, Mahwan, New Jersey), was found especially suitable for these liquid compositions used for preparing cast-in-place interlayer. Another high shear mixer is an ULTRATURRAX mixer (IKA-Works, Inc., Cincinnati, Ohio). Homogeneous compositions can be obtained using that mixer after mixing at 7000 rpm for 10 minutes. For each of the mixing procedures, care was taken to do the mixing under dry conditions by excluding moisture.

Viscosity of the Composition

The viscosity of the liquid composition was determined about 5 minutes after completing the mixing of a base composition, crosslinker composition, and if used, a paste composition. The measurement was carried out at ambient conditions (23° C. and 55% rH) on a Brookfield viscometer with a cone and spindle configuration at 10 rpm.

Pot-Life

The pot-life of the liquid composition was determined by measuring how long it took for the viscosity to increase at ambient conditions (23° C. and 55% rH) by 100% over its initial value, which was measured about 5 minutes after mixing the base composition, the crosslinker composition, and if used the paste composition.

Tensile Strength and Elongation at Break and Tear Strength

Tensile strength and elongation at break were determined in accordance with ASTM D-412 after curing the liquid composition specimen at ambient conditions (23° C. and 55% relative humidity) for about 5 hours in a metallic mold, followed by demolding the specimen and allowing it to cure for 3 weeks at ambient conditions between two sheets of polyethylene. The tear strength was determined in accordance with ASTM D-624 and the test specimens were prepared using the same curing conditions as for the tensile strength and elongation at break.

Test Procedures Used to Evaluate the Laminated Glass Units

Test were conducted with laminated glass units having 2 mm thick cast-in-place interlayers between two sheets of 3 mm thick glass and which were constructed as described above. Three sides of the laminated glass unit were sealed with the polyisobutylene seal, while at the fourth side the interlayer was exposed to the climate. In each test, the requirement was that the laminated glass unit pass a minimum test duration without appreciable color change and no deterioration or delamination of the interlayer.

1. Accelerated Weathering (35° C./75° C./100% rH)

Laminated glass units (150×150 mm or 150×75 mm in size) were placed into a humidity chamber conditioned at 100% relative humidity (rH) and thermally cycled between 35° C. and 75° C. The cycle consisted of a 4.5 hour "ramp-up" from 35° C. to 75° C., and a 1.5 hour "ramp-down" from 75° C. to 35° C. The units were expected to pass a minimum of 300 cycles.

2. QUV Aging (QUV/40° C.)

Laminated glass units (150×75 mm in size) were exposed in a QUV weathering tester to a continuous cycle of 16 hours of UV-B radiation (313 nm lamps) at 65° C., followed by 8 hours of water condensation at 40° C. The units were expected to pass a minimum of 30 cycles.

3. Heat Aging (70° C.)

Laminated glass units (150×150 mm or 150×75 mm in size) were stored in a ventilated convection-type oven at a temperature of 70° C. The units were expected to pass a minimum of 30 days test duration.

4. Temperature Cycling (−20° C./+23° C.)

Laminated glass units (150×150 mm or 150×75 mm in size) were exposed to a thermal cycle of 16 hours at −20° C. and 8 hours at ambient conditions (23° C., 55% rH) by storing the units in a freezer and under laboratory conditions respectively. The units were expected to pass a minimum of 30 cycles.

5. Outdoor Weathering (Outdoors)

Laminated glass units (300×300 mm in size) were exposed in Seneffe, Belgium, by mounting them on racks with a 45 degree inclination angle in such a manner that the edge of the unit, where the interlayer was freely exposed to the climate, was on top. The units were expected to pass a minimum of 90 days test duration.

Adhesion to Glass

Adhesion to glass was evaluated by using ISO 8339 test samples (International Standard ISO 8339, "Building Construction—Jointing—Products—Sealants—Determination of Tensile Properties, " International Organization for Standardization, Geneva, Switzerland, 1984). The test samples were constructed from two pieces of glass (75×12×6 mm in dimensions), previously primed with DC 1200 primer, by casting the liquid composition into a glass/timber mold, to form a 12×12×50 mm joint between the glass supports. After allowing the sample to cure for 3 weeks at ambient conditions (23° C. and 55% rH), the timber mold was removed. The tensile strength and maximum elongation of the test specimen were then determined in accordance with ISO 8339 with a ZWICK extensiometer.

Light Transmittance

The light transmittance in the visible spectrum (400–800 nm) was determined using a Near-Infrared Spectrophotometer (NIR System 6500, NIRSystem, Perstorp Inc., Siver Springs, Md.). The specimen consisted of two 3 mm thick panes of glass sandwiching a 2 mm thick cast-in-place interlayer. The measurement was carried out after allowing the samples to cure for 3 weeks at ambient conditions (23° C., 55% rH).

The following examples are presented for illustrative purposes and should not be construed as limiting the invention which is properly delineated in the claims. In the following examples, "part" or "parts" are expressed by weight, and viscosities are measured at 23° C.

Ingredients and Composition Nomenclature

The following nomenclature is used throughout the examples:

| INGREDIENT IDENTIFIER | INGREDIENT DESCRIPTION |
|---|---|
| A | Dimethylvinylsiloxy-endstopped polydimethylsiloxane ($4.5 \times 10^{-4}$ m$^2$/s). |
| B | Trimethylsiloxy-endstopped polymethylhydrogensiloxane ($3 \times 10^{-5}$ m$^2$/s). |
| C | Copolymer of dimethylsiloxane & methylhydrogensiloxane ($5 \times 10^{-6}$ m$^2$/s). |
| D | Methylvinylcyclotetrasiloxane. |
| E | Dimethylvinylsiloxy-endstopped polydimethylsiloxane ($2 \times 10^{-3}$ m$^2$/s). |
| F | Complex of chloroplatinic acid and divinyltetramethyldisiloxane having a platinum content of 0.7 weight percent. |
| G | Silicone elastomer particulate powder of spherical morphology and an average particle size of 3 micrometers (particle size distribution of 1 to 15 micrometers). This powder had a true specific gravity of 0.97, a bulk specific gravity of 0.18, and a water content of less than 0.5 weight percent. |
| H | Dry powder made from fumed silica and a 0.0125 m$^2$/s trimethylsiloxy endblocked polydimethylsiloxane fluid. Agglomerates were of irregular morphology, had a 10 to 300 micrometer particle size distribution, and contained 60% weight percent of the polydimethylsiloxane fluid. This powder had a true specific gravity of 1.5, a bulk specific gravity of 0.4, and a water content of less than 0.5 weight percent. The fumed silica, prior to preparation of the agglomerate, had a BET surface area of $200 \pm 25$ m$^2$/g, as measured by DIN 66131, and an average primary particle size of 0.012 micrometer. |
| I | Dry powder made from precipitated silica and a 0.0125 m$^2$/s trimethylsiloxy endblocked polydimethylsiloxane fluid. Agglomerates were of irregular morphology, had a 10 to 300 micrometer particle size distribution, and contained 60% weight percent of the polydimethylsiloxane fluid. The powder had a true specific gravity of 1.5, a bulk specific gravity of 0.4, and a water content of less than 5%. The precipitated silica, prior to the agglomeration, had a BET surface area of $380 \pm 30$ m$^2$/g, as measured by DIN 66131, and 42% of the primary aggregates had less than 1 micrometer in particle size. |
| J | Terpolymer of trimethylsiloxy units, dimethylvinylsiloxy units, and SiO$_2$ units having a ratio of combined trimethylsiloxy units and dimethylvinylsiloxy units per SiO$_2$ units of about 0.7/1. |
| K | Zirconium octoate in trimethylsiloxy endblocked polydimethylsiloxane fluid having a viscosity of 0.00002 m$^2$/s (1.56 weight percent zirconium octoate in the fluid), |

| CROSSLINKER COMPOSITION (contains SiH compound) | | |
|---|---|---|
| CROSSLINKER COMPOSITION | INGREDIENT | PARTS |
| I | A | 86.4 |
| | B | 6.2 |

| CROSSLINKER COMPOSITION (contains SiH compound) | | |
|---|---|---|
| CROSSLINKER COMPOSITION | INGREDIENT | PARTS |
| | C | 6.2 |
| | D | 1.2 |
| II | A | 96.9 |
| | B | 1.5 |
| | C | 1.5 |
| | D | 0.1 |
| III | B | 29.2 |
| | C | 41.2 |
| | D | 2.7 |
| | E | 17.4 |
| | J | 9.5 |
| IV | C | 60.0 |
| | D | 2.0 |
| | E | 24.7 |
| | J | 13.3 |
| V | B | 43.0 |
| | C | 25.6 |
| | D | 14.0 |
| | E | 11.3 |
| | J | 6.1 |
| VI | B | 29.0 |
| | C | 41.55 |
| | D | 3.45 |
| | E | 16.9 |
| | J | 9.1 |

| BASE COMPOSITIONS (contains Pt catalyst) | | |
|---|---|---|
| BASE COMPOSITION | INGREDIENT | PARTS |
| IV | K | 0.013 |
| | E | 64.9 |
| | F | 0.14 |
| | J | 34.96 |
| V | E | 63.15 |
| | F | 0.14 |
| | G | 2.7 |
| | J | 34.01 |

| PASTE COMPOSITION (contains additive) | | |
|---|---|---|
| PASTE COMPOSITION | INGREDIENT | PARTS |
| I | I | 50.00 |
| | E | 49.93 |
| | F | 0.08 |
| II | H | 50.00 |
| | E | 49.93 |
| | F | 0.08 |
| III | G | 25.00 |
| | E | 74.89 |
| | F | 0.11 |
| IV | G | 25.00 |
| | A | 74.60 |
| | F | 0.40 |

BASE COMPOSITIONS (contains Pt catalyst)

| BASE COMPOSITION | INGREDIENT | PARTS |
|---|---|---|
| I | E | 99.85 |
| | F | 0.15 |
| II | E | 99.47 |
| | F | 0.53 |
| III | E | 63.0 |
| | F | 0.24 |
| | G | 2.7 |
| | J | 34.047 |

| | LIQUID COMPOSITIONS | | | |
|---|---|---|---|---|
| COMPOSITION | BASE COMPOSITION | CROSSLINKER COMPOSITION | PASTE COMPOSITION | PARTS* RATIOS |
| 1** | I | I | — | 91.5/8.5/0 |
| 2 | I | I | I | 86/6/8 |
| 3 | I | I | II | 86/6/8 |
| 4 | I | I | III | 86/6/8 |
| 5 | I | I | III | 84.4/7.8/7.8 |
| 6 | II | II | IV | 11/68.5/20.5 |
| 7** | IV | IV | — | 10/1/0 |
| 8** | IV | V | — | 93/7/0 |
| 9 | V | V | — | 96.5/3.5/0 |
| 10 | III | III | — | 95/5/0 |
| 11 | V | VI | — | 95/5/0 |

*Note: Weight ratio is parts Base Composition: parts Crosslinker Composition: parts Paste Composition
**Comparative Compositions

EXAMPLE I

Table I contains the results of testing the liquid Compositions 1, 2, 3, 4, 5 and 6. The properties tested were as shown in Table I. Liquid Composition 1 was a comparative composition. The glass laminate made using an interlayer of the Liquid Composition 1 failed the Class C impact resistance test and from Table I, the value of the loss modulus, E'', was 60 MPa which was well below the needed 100 MPa.

TABLE I

| PROPERTY | COMPOSITION | | | | | |
| | 2 | 3 | 4 | 5 | 6 | 1** |
|---|---|---|---|---|---|---|
| Viscosity, m$^2$/s | 0.002 | 0.002 | 0.002 | 0.002 | 0.00085 | 0.002 |
| Pot Life, hours | 1 | 1 | 1 | 1 | 0.9 | 1 |
| Tensile Strength at break, MPa | 0.1 | 0.4 | 0.3 | 0.5 | 0.35 | 0.4 |
| Elongation at break, % | 100 | 90 | 120 | 110 | 45 | 50 |
| Tear Strength, kN/m | 0.5 | 0.6 | 0.6 | 0.6 | 0.6 | 0.6 |
| Adhesive Strength on Glass, T/A joints | | | | | | |
| Tensile Strength, MPa | 0.1 | 0.1 | 0.1 | 0.1 | 0.05 | 0.05 |
| Elongation at Break, % | 25 | 20 | 25 | 25 | 25 | 25 |

TABLE I-continued

| PROPERTY | COMPOSITION | | | | | |
|---|---|---|---|---|---|---|
| | 2 | 3 | 4 | 5 | 6 | 1** |
| tan delta (−120° C.) | 0.25 | 0.20 | 0.25 | 0.22 | 0.20 | 0.2 |
| E' (MPa) (−120° C.) | 2000 | 2500 | 2000 | 900 | 1500 | 300 |
| E" (MPa) (−120° C.) | 500 | 500 | 500 | 200 | 300 | 60 |
| Light Transmittance, % of 3/2/3 laminate over 400–800 rm range | — | — | >95 | — | >90 | — |
| Fire Resistance BS 476 (900 × 900 mm 3/2/3 mm laminate (minutes) | 19 | 24 | 27 | — | 15 | 12 |
| Impact Resistance BS 6206 Class (3/2/3 mm laminate) | Class B | Class C | Class C | Class C | Class C | fails Class C |
| Accelerated Aging | | | | | | |
| 6 months 75° C./100% rH | pass | pass | pass | pass | pass | pass |
| 6 months QUV/40° C. | pass | pass | pass | pass | pass | pass |
| 6 months 70° C. heat | pass | pass | pass | pass | pass | pass |
| 6 months −20° C./+25° C. | pass | pass | pass | pass | pass | pass |
| 12 months outdoors | pass | pass | pass | pass | pass | pass |
| 24 months outdoors | — | — | pass | — | pass | — |

| PROPERTY | COMPOSITION | | | | | |
|---|---|---|---|---|---|---|
| | 7** | 8** | 9 | 10 | 11 | 12*** |
| Viscosity, m²/s | 0.0055 | 0.005 | 0.005 | 0.003 | 0.005 | >1 |
| Pot Life, hours | 1 | 1 | 1 | 2.5 | 1 | — |
| Tensile Strength at break, MPa | 6.2 | 6.5 | 6.2 | 1.0 | 1.7 | 8.5 |
| Elongation at break, % | 100 | — | — | 120 | 135 | 750 |
| Tear Strength, kN/m | 2.7 | 4.6 | 4.5 | 1.2 | 1.8 | 20 |
| tan delta (−120° C.) | 0.12 | 0.23 | 0.33 | 0.33 | 0.3 | 0.1 |
| E' (MPa) (−120° C.) | 500 | 400 | 600 | 600 | 1000 | 2000 |
| E" (MPa) (−120° C.) | 60 | 90 | 200 | 200 | 300 | 200 |
| Fire Resistance ES 476 (900 × 900 mm 3/2/3 mm laminate (minutes) | — | — | — | >30 | >30 | 12 |
| Impact Resistance BS 6206 Class (3/2/3 mm laminate) | fails Class C | fails Class C | Class C | Class C | Class C | Class B |
| Accelerated Aging | | | | | | |
| 6 months 75° C./100% rH | — | — | — | pass | pass | — |
| 6 months QUV/40° C. | — | — | — | pass | pass | — |
| 6 months 70° C. heat | — | — | — | pass | pass | — |
| 6 months −20° C./+25° C. | — | — | — | pass | pass | — |
| 6 months outdoors | — | — | — | pass | pass | — |

***This composition was prepared by mixing 56 parts of a dimethylvinylsiloxy terminated polydimethylsiloxane/methylvinylsiloxane copolymer containing 0.142 mole percent of methylvinylsiloxane units and having a Williams Plasticity Number of 150, 10 parts of a hydroxyl terminated polydimethylsiloxane having a Williams Plasticity Number of 150, and 32 parts of a silica filler made in accordance with the procedure described in U.S. Pat. No. 4,985,525. This composition is presented as a comparative composition. Composition 12 was too viscous to be cast-in-place and had to be sheeted and then the laminate was prepared by sandwiching the sheeted composition between two glass panes.

EXAMPLE III

This example illustrates the need for high loss modulus (E") and loss factor (tan delta) values at −120° C. in order to pass the BS 6206 Class C impact resistance test with low tensile and low tear strength interlayers. Viscoelastic properties were as shown in Table 3 in which liquid composition of this invention were compared to compositions outside the scope of this invention such as the high strength composition identified as Composition 12 which was a very high viscosity material.

TABLE 3

| | 1 | 2 | 4 | 7 | 8 | 9 | 11 | 12 |
|---|---|---|---|---|---|---|---|---|
| BS 6206 Class C | fail | pass | pass | fail | fail | pass | pass | pass |

| T (°C.) | E' (MPa) | E" (MPa) | tan delta |
|---|---|---|---|
| COMPOSITION 1 | | | |
| −120 | 300 | 60 | 0.20 |
| −100 | 300 | 60 | 0.20 |
| −75 | 300 | 60 | 0.20 |
| −50 | 0.4 | 0.035 | 0.09 |
| −25 | 0.4 | 0.025 | 0.06 |
| 0 | 0.4 | 0.020 | 0.05 |
| COMPOSITION 2 | | | |
| −120 | 2000 | 500 | 0.25 |
| −100 | 800 | 100 | 0.13 |
| −75 | 700 | 50 | 0.07 |
| −50 | 0.8 | 0.03 | 0.04 |
| −25 | 0.6 | 0.01 | 0.02 |
| COMPOSITION 4 | | | |
| −120 | 2000 | 500 | 0.25 |
| −100 | 800 | 100 | 0.13 |
| −75 | 400 | 40 | 0.10 |
| −50 | 0.6 | 0.01 | 0.02 |
| −25 | 0.6 | 0.01 | 0.02 |
| COMPOSITION 7 | | | |
| −120 | 500 | 60 | 0.12 |
| −100 | 90 | 20 | 0.22 |
| −75 | 30 | 6 | 0.20 |
| −50 | 9 | 3 | 0.33 |

TABLE 3-continued

| | | | |
|---|---|---|---|
| −25 | 4 | 1 | 0.25 |
| 0 | 3 | 0.5 | 0.17 |
| COMPOSITION 8 | | | |
| −120 | 400 | 90 | 0.23 |
| −100 | 90 | 25 | 0.28 |
| −75 | 20 | 5.5 | 0.28 |
| −50 | 5 | 2 | 0.40 |
| −25 | 2.5 | 0.7 | 0.28 |
| 0 | 1.5 | 0.3 | 0.20 |
| COMPOSITION 9 | | | |
| −120 | 600 | 200 | 0.33 |
| −115 | 300 | 130 | 0.43 |
| −100 | 80 | 23 | 0.29 |
| −75 | 17 | 5 | 0.29 |
| −50 | 6 | 2 | 0,33 |
| −25 | 3 | 0.75 | 0.25 |
| 0 | 1.7 | 0.3 | 0.18 |
| COMPOSITION 11 | | | |
| −120 | 1000 | 300 | 0.30 |
| −125 | 600 | 250 | 0.42 |
| −100 | 90 | 22 | 0.24 |
| −75 | 18 | 5 | 0.28 |
| −50 | 6 | 2 | 0.33 |
| −25 | 3 | 0.7 | 0.23 |
| COMPOSITION 12[a] | | | |
| −120 | 2000 | 200 | 0.10 |
| −100 | 900 | 90 | 0.10 |
| −75 | 400 | 50 | 0.13 |
| −70 | 50 | 10.5 | 0.21 |
| −50 | 13 | 2 | 0.15 |
| −25 | 10 | 1.2 | 0.12 |
| 0 | 6 | 1 | 0.17 |
| +25 | 5 | 0.9 | 0.18 |

[a]The tan delta for Composition 12 went through a maximum at about −70° C. and showed that the composition at lower temperatures was in what may be termed "a frozen state."

EXAMPLE VI

This example illustrates the effect of laminate configuration, laminate size, and frame size on the fire test results (Fire tests: DIN 4102, Part 5 and BS 476, Part 22). The test results were as shown in Table 4.

TABLE 4

| | LAMINATE | | | | |
|---|---|---|---|---|---|
| COMPOSITION 4 | A | B | C | D | E |
| Laminate Configuration (in mm) | G/I/G 3/2/3 | G/I/C 3/2/3 | G/I/G 3/2/3 | G/I/C 3/2/3 | G/I/G/I/G 3/2/3/2/3 |
| Glass Dimensions (in mm) | 1000 × 1000 | 210 × 310 | 750 033 09 650 | 2010 × 1015 | 300 × 300 |
| Frame Material | Steel | Steel | Steel | Wood | Steel |
| Test | DIN | BS476 | BS476 | BS476 | DIN |
| Fire Resistance (in min) | 41 | >30 | >30 | 22 | >30 |

| COMPOSITION 5 | LAMINATE F |
|---|---|
| Laminate Configuration (in mm) | G/I/G 3/2/3 |
| Glass Dimensions (in mm) | 1050 × 900 |
| Frame Material | Wood |
| Test | BS476 |
| Fire Resistance (in min) | 26 |

DISCUSSION OF THESE EXAMPLES

Compositions 2, 3, 4, 5, 6, 9, 10 and 11 passed the BS 6206 Class C impact resistance test in 3/2/3 glass laminates and Composition 2 passed the Class B impact resistance requirements in a 3/2/3 glass laminate. These compositions had a loss modulus of 200 MPa or higher and a loss factor of 0.15 or higher; both properties being measured at −120° C. Glass laminates (3/2/3) made with these compositions passed a screening fire resistance test with more than 15 minutes fire endurance. Glass laminates made with these compositions exceeded all accelerated and natural aging durability requirements and exhibited excellent transparency, as demonstrated by Compositions 4 and 6.

Glass laminates (3/2/3) made with the Comparative Compositions 1, 7, and 8 failed the impact resistance requirements of BS 6206 Class C. These comparative compositions exhibited a loss modulus, measured at −120° C., of below 100 MPa, which, based on the experimentation, is believed to be the minimum value required to pass the impact resistance test. Comparative Composition 7 exhibited a tan delta, measured at −120° C., of 0.12, which was below 0.15, which, based on the experimentation, is believed to be the minimum value required to pass the impact resistance test.

Compositions 2, 3, and 4 when compared to Comparative Composition 1 showed the effect of fillers G, H, and I on the properties of the cured interlayer compositions and of the glass laminates made therefrom. Both storage modulus and loss moduli, measured at −120° C., increased significantly upon addition of these fillers. The tear strength, measured at room temperature, was not affected by the filler addition. The filled compositions achieved somewhat higher elongations at break, however, the tensile strengths of these compositions was not improved. The filled compositions of this invention passed the impact resistance requirements (BS 6206 Class C or B) in 3/2/3 glass laminates, while the unfilled comparative compositions did not pass the BS 6206 Class C requirements.

Composition 9 compared to Composition 8 showed the same effect of filler G as for Composition 4. Both storage and loss moduli increased significantly upon addition of filler G. The loss modulus of Composition 9 increased more pronounced than the storage modulus and the addition of filler G also resulted in an increase in the loss factor, tan delta. Composition 9 passed the BS 6206 Class C impact resistance test in 3/2/3 glass laminates, while Comparative Composition 8 failed this test.

From these comparisons, the improvements in the impact resistance was related to the better damping characteristics (higher loss modulus and higher tan delta), measured at −120° C., of the filled compositions, and not to changes in their physical properties at room temperature. The improved damping characteristics, measured at −120° C., were directly attributed to the use of fillers (G, H, and I).

The high strength Comparative Composition 12 also passed the requirements of BS 6206 Class B impact resistance test, however, as shown below, this performance was attributed to the high tear strength of this composition, and not to its damping properties at −120° C. It is also noted that, due to its gummy character, this composition was only available as performed (calendered) interlayer sheets.

The loss factor of Compositions 2 and 4 increased steadily with decreasing measurement temperatures, while the loss factor Compositions 9 and 11 went through a side maximum at about −55° C., followed by a side minimum at about −100° C., then rapidly increased with decreasing measurement temperatures to its absolute maximum at −115° C. The loss factor of unfilled Comparative Composition 1 reached its maximum at about −75° C. and remained constant with further decreasing measurement temperatures. The loss factor of Comparative Compositions 7 and 8 went through its absolute maximum at about −50° C., and then rapidly decreased toward lower measurement temperatures.

The effect of fillers G and I on the loss factor, the loss modulus, and the storage modulus was shown by comparing these properties for Compositions 1, 2, and 4 in Example III. The effect of filler G on the loss factor, the loss modulus, and the storage modulus was shown by comparing these properties for Compositions 8 and 9 in Example III.

The high strength interlayer (Composition 12) did not provide for a strong molecular relaxation mechanism at temperatures below −100° C. as shown by the values in Example III. The loss factor went through a maximum at about −75° C. and then decreased rapidly with decreasing temperature. The fact that Composition 12 exhibited a loss modulus of 200 MPa at −120° C. was only attributed to its high storage modulus at that temperature, because the loss factor was low (0.1). The high strength interlayer Composition 12, thus, passed the BS 6206 Class B impact resistance test not because of its high tear strength. The toughness of Composition 12 interlayer was attributed to the use of the highly disperse silica described by Lutz in U.S. Pat. No. 4,344,800. Its use in compositions of this invention would not result in an improvement of the damping characteristics at temperatures below −100° C., because the maximum of the loss modulus of Composition 12 at −75° C. was attributed to this filler.

As seen from the above discussion of the experimental results, there are two criteria that need to be met in order to achieve good impact resistance in the glass laminate via molecular energy dissipation in the interlayer: (a) the loss modulus of the interlayer composition at temperatures below about −100° C. needs to be as high as possible; based on experimentation, a minimum loss modulus of 100 MPa needs to be achieved at −120° C., (b) the loss factor of the interlayer composition at temperatures below about −100° C. needs to be as high as possible; based on experimentation, a minimum loss factor of 0.15 needs to be achieved at −120° C.

That which is claimed is:

1. A pourable curable composition comprising
(A) at least one polydiorganosiloxane wherein the silicon-bonded organic substituents are monovalent hydrocarbon groups having from 1 to 14 carbon atoms, at least 70 per cent of said organic substituents being methyl and there being present at least two silicon-bonded ethylenically-unsaturated groups per molecule on average, and a kinematic viscosity at 25° C. of 0.0001 to 0.01 m$^2$/s,
(B) at least one organohydrogensiloxane having at least two silicon-bonded hydrogen atoms per molecule on average,
(C) a catalyst for the addition of SiH groups to silicon-bonded ethylenically-unsaturated groups, and
(D) a particulate filler which is at least partially insoluble in the composition, said filler being present in an amount of 2 to 15 weight percent based on the total weight of components (A) through (D),
said composition having in the cured elastomeric state a loss modulus E″ of at least 100 MPa at a temperature of −120° C., a loss factor (tan delta) of at least 0.15 at a temperature of −120° C., E″ and tan delta being measured at 16 Hertz and 0.1% strain, and a tear strength of less than 10 kN/m at 23° C.

2. The composition according to claim 1, wherein E″ has a value of from 200 to 500 MPa and tan delta has a value of from 0.2 to 0.3.

3. The composition according to claim 1, wherein the filler (D) is selected from the group consisting of (i) a particulate material consisting essentially of a reinforcing silica having absorbed thereon at least 30 percent by weight, based on the weight of the silica, of a polydiorganosiloxane having a viscosity at 25° C. of 0.001 to 0.02 m$^2$/s, and wherein at least 80 per cent of the total silicon-bonded organic groups are methyl, any remaining silicon-bonded organic groups being phenyl or vinyl groups, and (ii) a silicone elastomer in particulate form.

4. The composition according to claim 2, wherein the filler (D) is selected from the group consisting of (i) a particulate material consisting essentially of a reinforcing silica having absorbed thereon at least 30 percent by weight, based on the weight of the silica, of a polydiorganosiloxane having a viscosity at 25° C. of 0.001 to 0.02 m$^2$/s, and wherein at least 80 per cent of the total silicon-bonded organic groups are methyl, any remaining silicon-bonded organic groups being phenyl or vinyl groups, and (ii) a silicone elastomer in particulate form.

5. The composition according to claim 3, wherein the reinforcing silica (i) has absorbed thereon at least 50 per cent by weight of polydiorganosiloxane.

6. The composition according to claim 4, wherein the reinforcing silica (i) has absorbed thereon at least 50 per cent by weight of polydiorganosiloxane.

7. The composition according to claim 1 in which the catalyst (C) is a platinum compound or a platinum complex with a polyorganosiloxane having silicon-bonded olefinically unsaturated organic substituents.

8. The composition according to claim 4 in which the catalyst (C) is a platinum compound or a platinum complex with a polyorganosiloxane having silicon-bonded olefinically unsaturated organic substituents.

9. The composition according to claim 1 where the composition has a viscosity after mixing components (A) through (D) of less than 0.005 m$^2$/s at 25° C. when measured with a cup and spindle configuration at 10 rpm on a Brookfield viscometer.

10. The composition according to claim 4 where the composition has a viscosity after mixing components (A) through (D) of less than 0.005 m$^2$/s at 25° C. when measured with a cup and spindle configuration at 10 rpm on a Brookfield viscometer.

11. The composition according to claim 4 in which the filler (D) is (i), a polydiorganosiloxane fluid-silica agglomerate having a particle size distribution within the range of 1 to 500 micrometers.

12. The composition according to claim 4 in which the filler (D) is (ii), a silicone elastomer particulate filler having a particle size distribution within the range of 0.1 to 50 micrometers.

13. The composition according to claim 1 further comprising an additive for imparting fire retardant properties to the cured composition.

14. The composition according to claim 1 further comprising a resinous copolymer comprising $R_3SiO_{0.5}$ units and $SiO_2$ units, wherein each R is selected from methyl radical and vinyl radical, at least one R group per molecule being vinyl.

15. A laminate structure comprising at least two panels of glass having sandwiched between at least two of said panels cured product of a pourable curable composition comprising
- (A) at least one polydiorganosiloxane wherein the silicon-bonded organic substituents are monovalent hydrocarbon groups having from 1 to 14 carbon atoms, at least 70 per cent of said organic substituents being methyl and there being present at least two silicon-bonded ethylenically-unsaturated groups per molecule on average, and a kinematic viscosity at 25° C. of 0.0001 to 0.01 m²/s,
- (B) at least one organohydrogensiloxane having at least two silicon-bonded hydrogen atoms per molecule on average,
- (C) a catalyst for the addition of SiH groups to silicon-bonded ethylenically-unsaturated groups, and
- (D) a particulate filler which is at least partially insoluble in the composition, said filler being present in an amount of 2 to 15 weight percent based on the total weight of components (A) through (D), said composition having in the cured elastomeric state a loss modulus E″ of at least 100 MPa at a temperature of −120° C., a loss factor (tan delta) of at least 0.15 at a temperature of −120° C., E″ and tan delta being measured at 16 Hertz), and a tear strength of less than 10 kN/m at 23° C., and said laminate when receiving a panel breaking impact fails safely.

* * * * *